US012597766B2

(12) United States Patent (10) Patent No.: US 12,597,766 B2
Zhang et al. (45) Date of Patent: Apr. 7, 2026

(54) ANTI-SPARKING METHOD FOR POWER TOOL, AND CONTROL DEVICE, AND COMPUTER-READABLE STORAGE MEDIUM

(71) Applicant: JIANGSU DONGCHENG TOOLS TECHNOLOGY CO., LTD, Nantong (CN)

(72) Inventors: Jin Zhang, Nantong (CN); Haojie Fan, Nantong (CN)

(73) Assignee: JIANGSU DONGCHENG TOOLS TECHNOLOGY CO., LTD, Nantong (CN)

( * ) Notice: Subject to any disclaimer, the term of this patent is extended or adjusted under 35 U.S.C. 154(b) by 0 days.

(21) Appl. No.: 18/870,510

(22) PCT Filed: Jun. 28, 2023

(86) PCT No.: PCT/CN2023/103424
§ 371 (c)(1),
(2) Date: Nov. 29, 2024

(87) PCT Pub. No.: WO2024/093295
PCT Pub. Date: May 10, 2024

(65) Prior Publication Data
US 2025/0373004 A1 Dec. 4, 2025

(30) Foreign Application Priority Data
Nov. 3, 2022 (CN) .......................... 202211371825.5

(51) Int. Cl.
*H02H 7/08* (2006.01)
*B25F 5/02* (2006.01)

(52) U.S. Cl.
CPC ................. *H02H 7/08* (2013.01); *B25F 5/02* (2013.01)

(58) Field of Classification Search
CPC ................................... H02H 7/08; B25F 5/02
See application file for complete search history.

(56) References Cited

U.S. PATENT DOCUMENTS

| | | | | |
|---|---|---|---|---|
| 3,959,704 A | * | 5/1976 | McCrea | H02P 1/28 |
| | | | | 361/29 |
| 5,293,308 A | * | 3/1994 | Boys | H02M 5/458 |
| | | | | 324/392 |

(Continued)

FOREIGN PATENT DOCUMENTS

| | | | |
|---|---|---|---|
| CN | 101022259 A | * | 8/2007 |
| CN | 102647128 A | * | 8/2012 |

(Continued)

*Primary Examiner* — Lucas E. A. Palmer
(74) *Attorney, Agent, or Firm* — ScienBiziP, P.C.

(57) ABSTRACT

An anti-sparking method for a power tool includes the following steps: (1) turning on a controlling switch, which causes a motor to rotate, and a MCU module to record a first operation state of the motor; (2) turning off the controlling switch which causes the motor begin to stop rotating and the MCU module to record a time duration from a time point of the motor being begun to stop rotating to a time point of the motor completely stopped rotating as t1; (3) turning on the controlling switch again, which causes the MCU module to record a second operation state of the motor. When the first and second operation states are different, the MCU module controls the power module to supply power to the motor driving module after a delay time duration, which is longer than t1. A control device and a computer readable storage medium are also provided.

20 Claims, 6 Drawing Sheets

(56)     References Cited

U.S. PATENT DOCUMENTS

| | | | | |
|---|---|---|---|---|
| 11,597,050 | B2 * | 3/2023 | Privett, Jr. | .............. B25F 5/008 |
| 2006/0157260 | A1 | 7/2006 | Greese et al. | |
| 2016/0204718 | A1 | 7/2016 | Koizumi et al. | |
| 2019/0181749 | A1 * | 6/2019 | Flipo | .................... H02M 3/156 |
| 2019/0181862 | A1 * | 6/2019 | Flipo | ................. H03K 19/0008 |

FOREIGN PATENT DOCUMENTS

| | | | | | |
|---|---|---|---|---|---|
| CN | 102647128 | B | | 7/2014 | |
| CN | 105392600 | A | * | 3/2016 | ............... H02P 3/06 |
| CN | 111384884 | A | | 7/2020 | |
| CN | 111756299 | A | * | 10/2020 | ......... H02P 23/0027 |
| CN | 115383664 | A | * | 11/2022 | ............ B25D 16/00 |
| CN | 115913055 | A | * | 4/2023 | ............... B25F 5/00 |
| JP | S61134693 | U | * | 8/1986 | |
| JP | H0693071 | B2 | * | 11/1994 | |
| WO | WO-2017128113 | A1 | * | 8/2017 | ............. H02H 9/02 |
| WO | WO-2020134159 | A1 | * | 7/2020 | ............. H02P 23/24 |
| WO | WO-2023102164 | A1 | * | 6/2023 | ............. B25F 5/00 |
| WO | WO-2023113588 | A1 | * | 6/2023 | ............. A01G 3/08 |

* cited by examiner

ANTI-SPARKING METHOD FOR POWER TOOL, AND CONTROL DEVICE, AND COMPUTER-READABLE STORAGE MEDIUM

FIELD

The present application relates to the field of power tool technology, in particular relates to an anti-sparking method for a power tool, a control device, and a computer readable storage medium.

BACKGROUND

When a controlling switch is turned off, an AC brushed motor remains rotating for a time duration and then stops rotating. During the time duration, a reversing switch is changed to another direction, and the motor rotates in an opposite direction, a sparking phenomenon of the motor is serious, and a safety risk exists. The existing solution is to add a Hall component which produces a voltage level change while the motor rotates. By detecting the state of the Hall, the motor can be prevented from reversing when it is not stopped, and the sparking phenomenon is avoided. However, the existing solution has three disadvantages:

1, the Hall component and a magnet ring disposed at the motor end occupy an internal space of the power tool;

2, a controlling panel connects with the Hall component through a cable, and a risk of a failure increases;

3, The magnetic ring may be demagnetized, and the Hall element may be damaged.

In view of this, it is necessary to provide an anti-sparking method for a power tool, a control device, and a computer readable storage medium, to overcome the defects existing in the prior art.

SUMMARY OF THE INVENTION

In view of the deficiencies in the prior art, an objective of the present application is to provide an anti-sparking method for a power tool, a control device, and a computer readable storage medium, which may increase an internal space of the power tool.

To solve the existing technical problems, the present application adopts the following technical solution: an anti-sparking method for a power tool, the power tool includes a power module, a motor, a controlling switch, a motor driving module, and a MCU module. Whether the power module supplies the power to the motor driving module by controlling the controlling switch on or off. When the controlling switch is turned on, the power module can supply the power to the motor driving module, i.e. the motor driving module is powered on. When the controlling switch is turned off, the power module can not supply the power to the motor driving module, i.e. the motor driving module is powered down. The anti-sparking method includes the following steps:

(1) Turning on the controlling switch to power on the motor driving module for driving the motor to rotate, which causes the power tool to work normally. When the power tool works normally, and the MCU module records a first operation state of the motor, which is a forward rotation state A or a reverse rotation state B.

(2) Turning off the controlling switch to power down the motor driving module, which causes the motor to begin to stop rotating. When the motor begins to stop rotating, and a time duration from a time point of the motor being begun to stop rotating to a time point of the motor completely stopped rotating is recorded as t1.

(3) When the controlling switch is turned on again, the MCU module records a second operation state of the motor. The second operation state is the forward rotation state A or the reverse rotation state B. When the second operation state is the same as the first operation state, the MCU module controls the power module to supply power to the motor driving module. When the second operation state is different from the first operation state, the MCU module controls the power module to supply power to the motor driving module after a delay time duration, which is longer than t1.

Further, the MCU module includes a MCU chip. The MCU chip includes a FLASH memory. The FLASH memory is configured to record at least one of the first operation state and the second operation state of the motor, and record the time duration t1 from a time point of the motor being begun to stop rotating to a time point of the motor completely stopped rotating.

Further, the motor driving module includes a first bidirectional diode, a second bidirectional diode, a third bidirectional diode, and a fourth bidirectional diode. When the motor rotates in a forward direction, the first bidirectional diode and the second bidirectional diode are in a turn-on state, and the third bidirectional diode and the fourth bidirectional diode are in a turn-off state. When the motor rotates in a reverse direction, the third bidirectional diode and the fourth bidirectional diode are in the turn-on state, and the first bidirectional diode and the second bidirectional diode are in the turn-off state.

Further, the power tool includes a reversing switch for controlling the forward rotation state and the reverse rotation state of the motor 30. In step (1), when the reversing switch is set at a forward direction, the motor driving module is powered on for driving the motor to rotate after the controlling switch is turned on. When the power tool works normally, the MCU module records the forward rotation state A of the motor. When the reversing switch is set at a reverse direction, the motor driving module is powered on for driving the motor to rotate after the controlling switch is turned on. When the power tool works normally, and the MCU module records the reversing rotation state B of the motor.

Further, the MCU module is electrically connected with the motor driving module and the power module. The power module is electrically connected with the motor driving module.

Further, the power tool further includes a memory module. The anti-sparking method may include following steps:

(1) Turning on the controlling switch to power on the motor driving module for driving the motor to rotate, which causes the power tool to work normally. When the power tool works normally, the memory module records a first operation state of the motor, which is a forward rotation state A or a reverse rotation state B.

(2) Turning off the controlling switch to power down the motor driving module, which causes the motor to begin to stop rotating. When the motor begins to stop rotating, and the memory module records a time duration from a time point of the motor being begun to stop rotating to a time point of the motor completely stopped rotating, as t1.

(3) When the controlling switch is turned on again, the memory module records a second operation state of the motor. The second operation state is a forward rotation state A or a reverse rotation state B. When the second operation state is the same as the first operation state, the MCU module controls the power module to supply power to the motor driving module. When the second operation state is different from the first operation state, the MCU module controls the power module to supply power to the motor driving module after a delay time duration, which is longer than t1.

Further, a control device, the control device with an anti-sparking function, the control device includes:

A first processing module is configured to detect a signal generated by the controlling switch. When the first processing module determines that the controlling switch is turned on according to the signal, the MCU module records a first operation state of the motor, which is a forward rotation state A or a reverse rotation state B.

A second processing module is configured to detect the signal generated by the controlling switch. When the second processing module determines that the controlling switch is turned off according to the signal, the motor begins to stop rotating, and the MCU module records a time duration from a time point of the motor being begun to stop rotating to a time point of the motor completely stopped rotating, as t1.

A third processing module is configured to detect the signal generated by the controlling switch. When the third processing module determines that the controlling switch is turned on again according to the signal, the MCU module records a second operation state of the motor. When the second operation state is the same as the first operation state, the third processing module controls the power module to supply power to the motor driving module. When the second operation state is different from the first operation state, the third processing module controls the power module to supply power to the motor driving module after a delay time duration, which is longer than t1.

Further, the first processing module, the second processing module, and the third processing module are same or different modules.

Further, a computer readable storage medium, the computer readable storage medium having non-volatile program codes executable by a processor, where the program codes are used to make the processor execute the method.

Compared with the prior art, the present application has one or more beneficial effects: using the anti-sparking method for the power tool, the control device, and the computer readable storage medium, the space required to add magnetic rings and Hall elements at the motor end can be eliminated, thereby saving the internal space of the power tool. Without the Hall component, there is no need to make a control panel connecting with the Hall component through a cable, thereby avoiding failure and increasing work efficiency; by using the method of the present application, the magnetic ring and the Hall component may be omitted, and a cost is saved.

BRIEF DESCRIPTION OF THE DRAWINGS

The following is a further detailed explanation of specified embodiments of the present application in conjunction with the accompanying drawings.

DETAILED DESCRIPTION

The embodiments of the present application will be described clearly and completely in detail below in conjunction with the accompanying drawings. Obviously, the described embodiments are only some of the embodiments of the present application, not all of the embodiments. Based on the embodiments of this application, all other embodiments obtained by persons of ordinary skill in the art without creative efforts fall within the protection scope of this application.

In the description of the present application, it should also be noted that, in the description of the application, the terms "installed", "engage", and "connect" should be interpreted in a broad sense unless explicitly defined and limited otherwise, which, for example, it can be a fixed connection, a detachable connection or an integral connection; it can be a mechanical connection or an electrical connection; and it can be a direct connection, an indirect connection by means of an intermediary, or internal communication between two elements. For those skilled in the art, the specific meaning of the above-mentioned terms in the application can be interpreted according to the specific situation.

Furthermore, in the following detailed description of the present application, numerous specific details are set forth in order to provide a thorough understanding of the present application. However, it will be recognized by one of ordinary skill in the art that the present application may be practiced without these specific details. In other instances, well known methods, procedures, components, and circuits have not been described in detail as not to unnecessarily obscure aspects of the present application.

Besides, the technical features involved in different embodiments of the present application described herein may be combined mutually as long as no conflictions are constituted there among.

Figure 1:
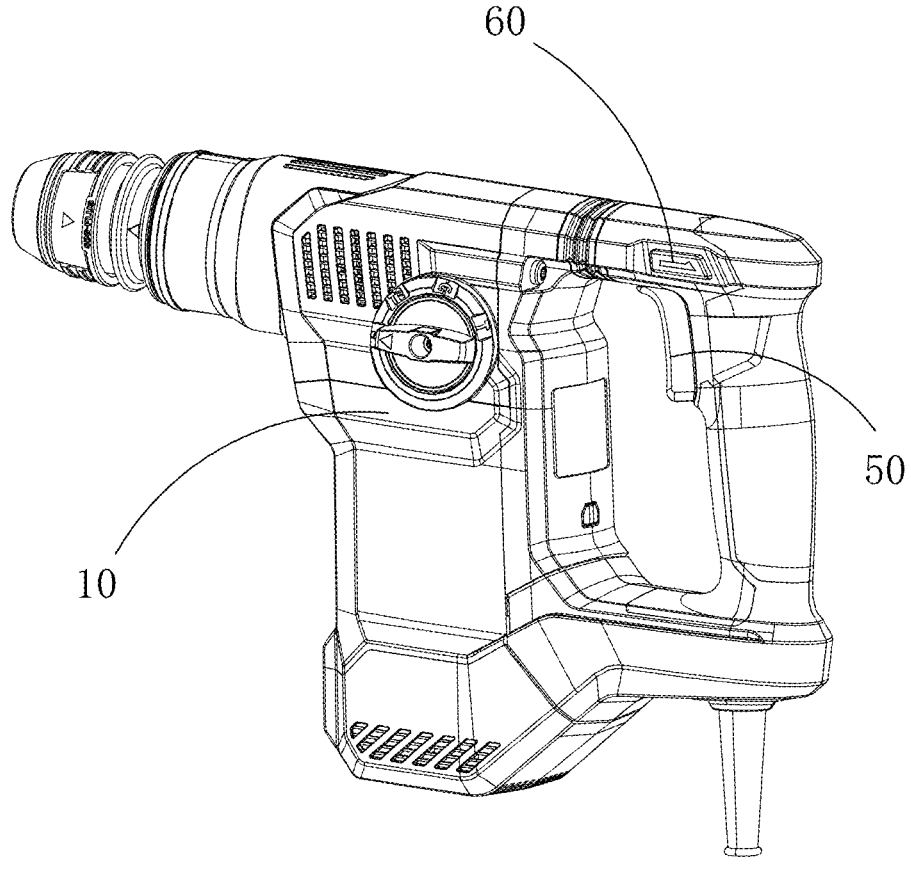
FIG. 1 is a three-dimensional schematic view of a power tool of an embodiment of the present application.
Figure 2:
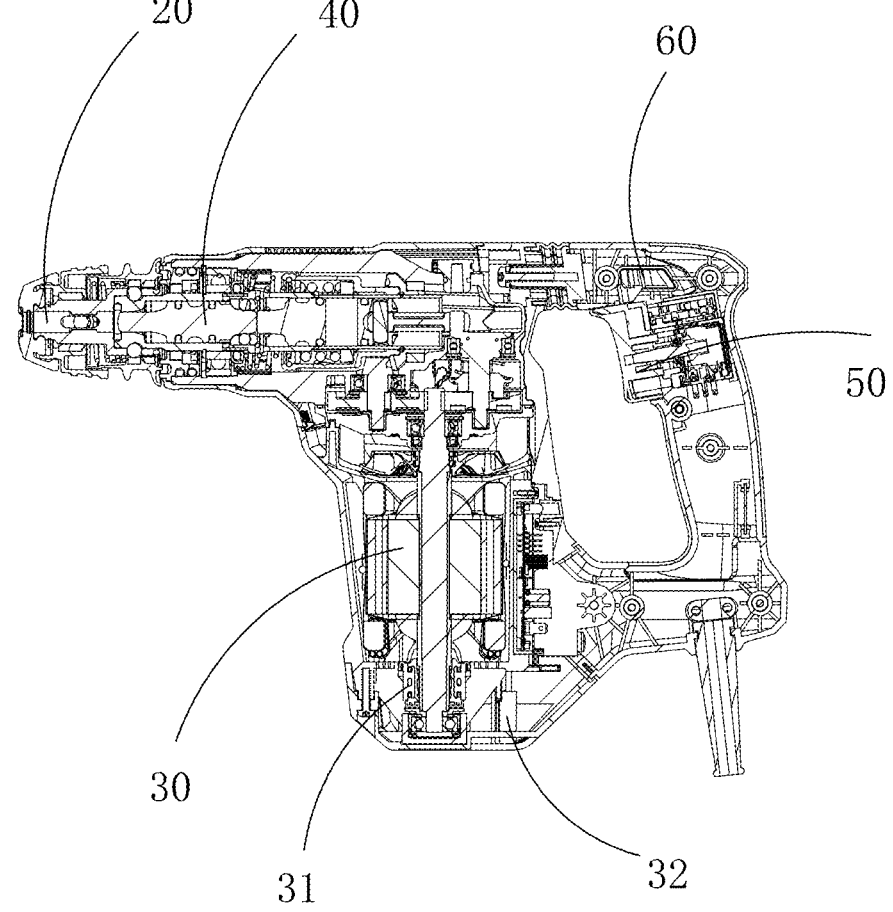
FIG. 2 is a cross-sectional view of the power tool of FIG. 1.

Refereeing to FIGS. 1 and 2, which illustrate a power tool 100 of the present application, being widely used in the fields of building and construction. In the embodiment, the power tool 100 is an electric hammer, which includes a housing 10, an execution component 20, a motor 30 disposed in the housing 10, and a transmission mechanism 40 for driving the execution component 20 while being driven by the motor 30. The execution component 20 includes a sleeve and a drill bit. Thus, the electric hammer 100 may drive the execution component 20 to drill holes in hard materials such as walls, concrete, bricks, and stones. The motor 30 is an AC brushed motor and includes a commutator 31 and a carbon brush 32. The motor 30 with the commutator 31 releases electromagnetic noise because of rectification sparks generated between the commutator 31 and the carbon brush 32.

The power tool 100 further includes a controlling switch for controlling the motor 30 being turned on or turned off and a reversing switch 60 for controlling the forward rotation state and the reverse rotation state of the motor 30. The motor 30 remains operating for a time duration after the controlling switch 50 is turned off. During the time duration, the reversing switch 60 is switched to another direction for controlling the motor 30 to rotate in an opposite direction, a sparking phenomenon of the motor 30 is serious, a safety risk exists. In a related art, Hall elements and magnetic rings are added, because the Hall elements produce level changes when the motor 30 rotates. By detecting the state of the Hall, the motor 30 can be prevented from reversing when it is not stopped, and the sparking phenomenon is avoided. However, the existing solution has three disadvantages: 1, the Hall component and the magnet ring disposed at an end of the motor occupy an internal space of the power tool; 2, a control panel connects with the Hall component through a cable, and a risk of a failure increases; 3, The magnetic ring may be demagnetized, and the Hall element may be damaged.

Figure 3:
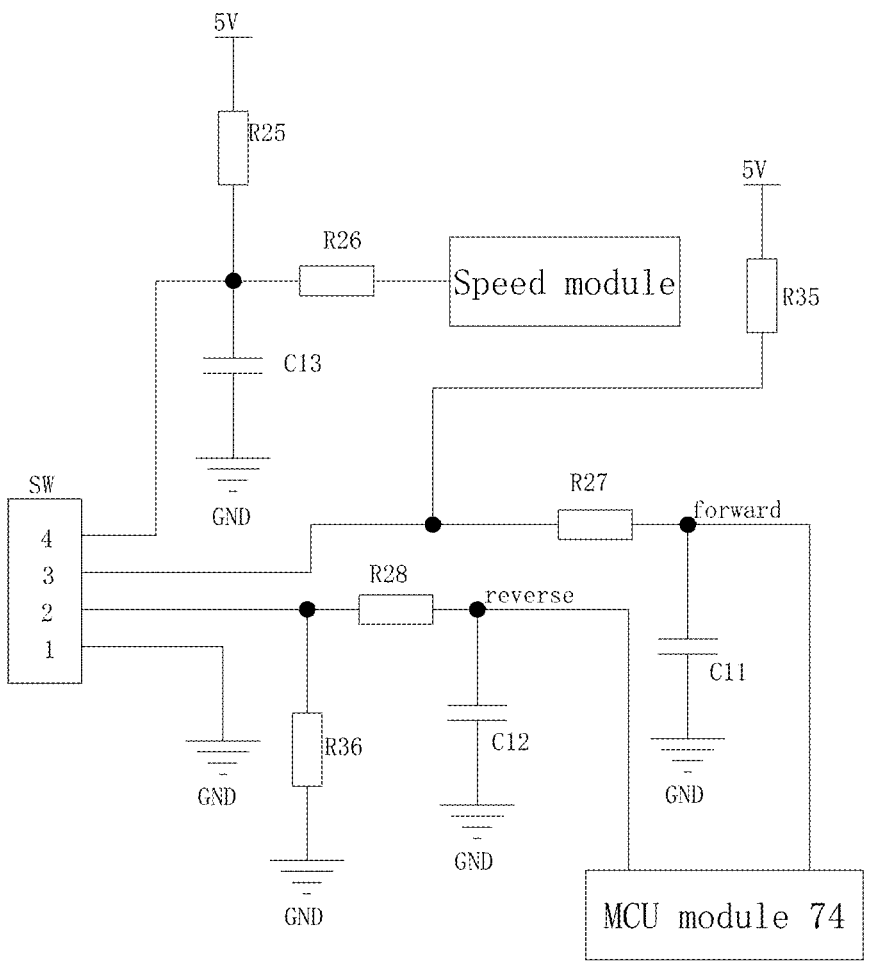
FIG. 3 is a circuit diagram of a memory module of the power tool of FIG. 1.
Figure 4:
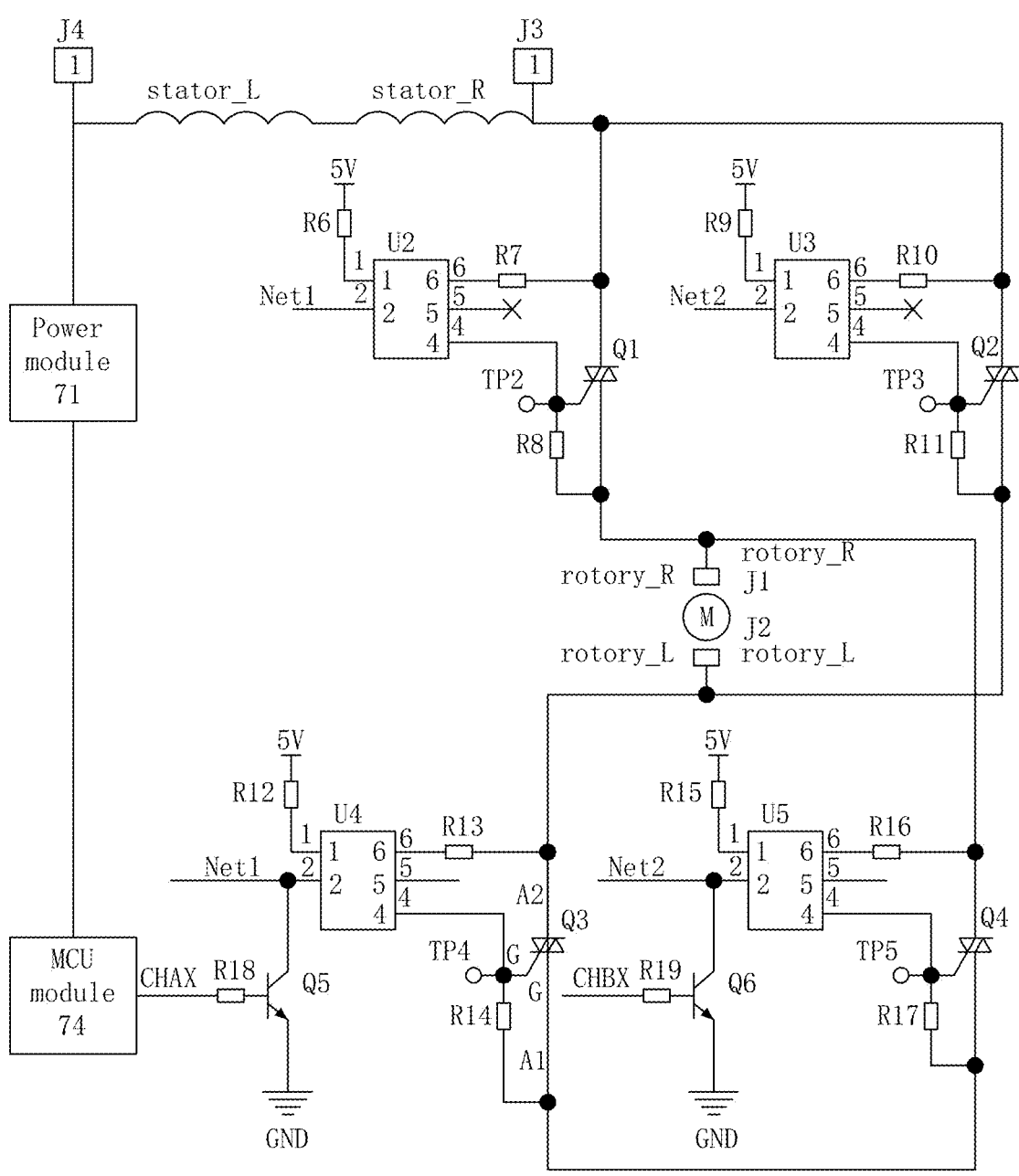
FIG. 4 is a circuit diagram of a motor driving module of the power tool of FIG. 1.
Figure 5:
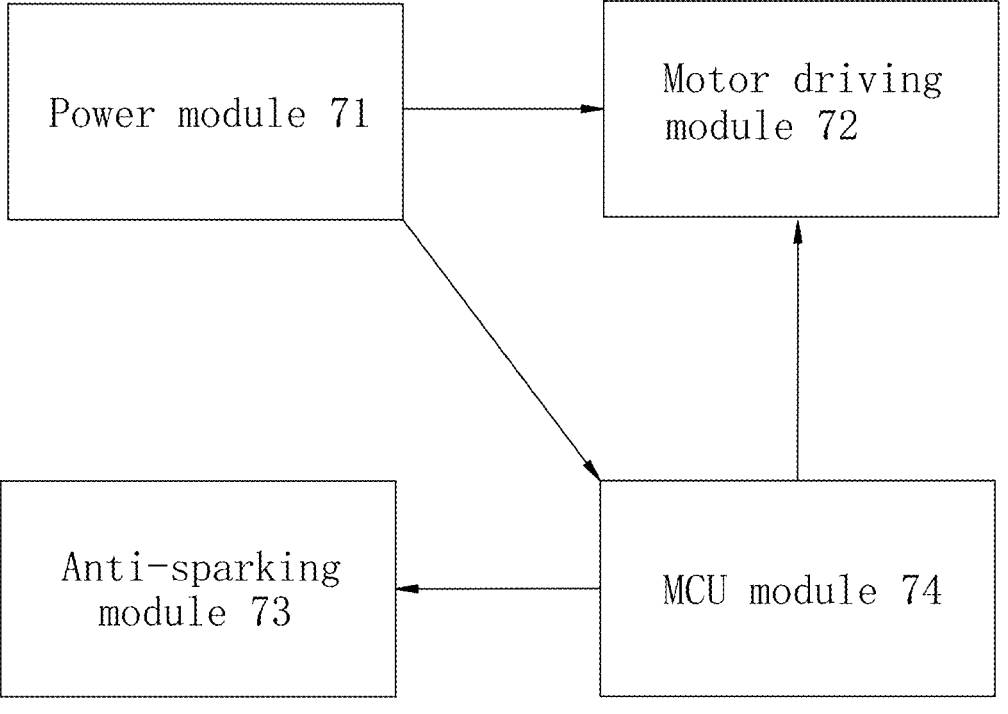
FIG. 5 is a structure diagram of main modules of the power tool of FIG. 1.

Referring to FIGS. 3-5, in a first preferably embodiment of the present application, the anti-sparking method, which does not occupy the internal space and increases an efficiency, is used in a power tool. In the embodiment of the present application, the power tool 100 further includes a power module 71, a motor driving module 72, and a MCU module 74. The motor driving module 72 includes a first bidirectional diode Q1, a second bidirectional diode Q2, a third bidirectional diode Q3, and a fourth bidirectional diode Q4. When the motor 30 rotates in a forward direction, the first bidirectional diode Q1 and the second bidirectional diode Q2 are in a turn-on state, and the third bidirectional diode Q3 and the fourth bidirectional diode Q4 are in a turn-off state. When the motor 30 rotates in a reverse direction, the third bidirectional diode Q3 and the fourth bidirectional diode Q4 are in the turn-on state, and the first bidirectional diode Q1 and the second bidirectional diode Q2 are in the turn-off state. The MCU module 74 is electrically connected with the motor driving module 72 and the power module 71. The power module 71 is electrically connected with the motor driving module 72. The power tool further includes a speed controlling module. The MCU module 74 is electrically connected with the speed controlling module. The power module 71 supplies power to the MCU module 74, and the MCU module 74 is initialized. Whether the power module 71 supplies the power to the motor driving module 72 by controlling the controlling switch 50 on or off. When the controlling switch 50 is turned on, the power module 71 can supply the power to the motor driving module 72, i.e. the motor driving module 72 is powered on. When the controlling switch 50 is turned off, the power module 71 can not supply the power to the motor driving module 72, i.e. the motor driving module 72 is powered down. The anti-sparking method is performed.

Figure 6:
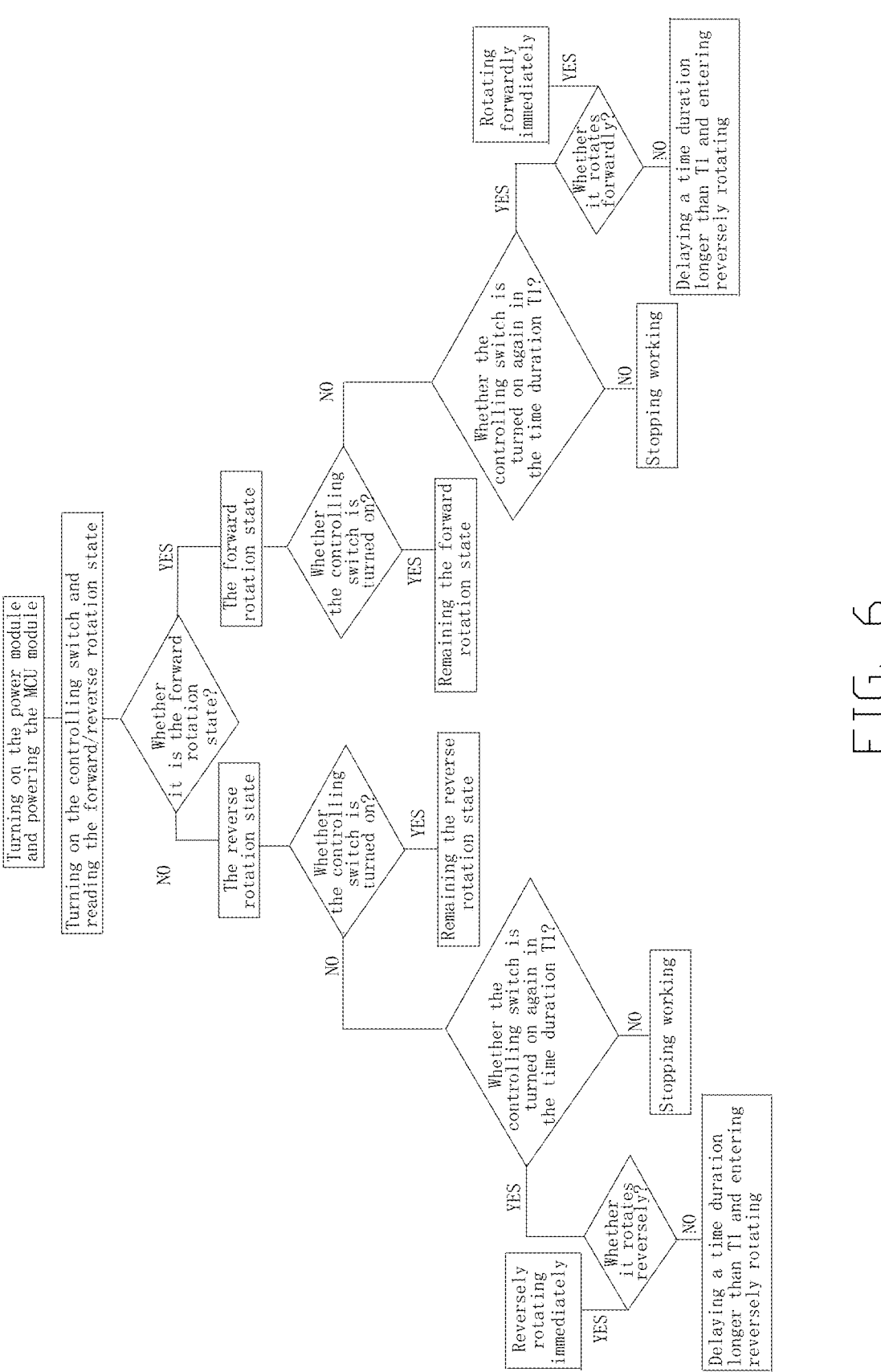
FIG. 6 is an operation flowchart of a power tool using the anti-sparking method.

Referring to FIG. 6, the anti-sparking method includes the following steps.

(1) Turning on the controlling switch 50 to power on the motor driving module 72 for driving the motor 30 to rotate, which causes the power tool 100 to work normally. When the power tool 100 works normally, the MCU module 74 records a first operation state of the motor 30, which is a forward rotation state A or a reverse rotation state B.

(2) Turning off the controlling switch 50 to power down the motor driving module 72, which causes the motor 30 to begin to stop rotating. When the motor 30 begins to stop rotating, and the MCU module 74 records a time duration from a time point of the motor 30 being begun to stop rotating to a time point of the motor 30 completely stopped rotating, as t1.

(3) When the controlling switch 50 is turned on again, the MCU module 74 records a second operation state of the motor 30, when the power tool 100 works normally. The second operation state is the forward rotation state A or the reverse rotation state B. When the second operation state is the same as the first operation state, the MCU module 74 controls the power module 71 to supply power to the motor driving module 72. When the second operation state is different from the first operation state, the MCU module 74 controls the power module 71 to supply power to the motor driving module 72 after a delay time duration, which is longer than t1.

In a preferably embodiment of the present application, the MCU module 74 includes a MCU chip. The MCU chip includes a FLASH memory. The FLASH memory is configured to record at least one of the first operation state and the second operation state of the motor 30, and record the time duration t1 from a time point of the motor 30 being begun to stop rotating to a time point of the motor 30 completely stopped rotating.

The reversing process may be controlled by the MCU module 74, and also may be controlled by a mechanical operation. In a preferably embodiment of the present application, the power tool 100 includes a reversing switch 60 for controlling the forward rotation state and the reverse rotation state of the motor 30. In step (1), when the reversing switch 60 is set at a forward direction and the controlling switch 50 is turned on, the motor driving module 72 is powered on for driving the motor 30 to rotate. When the power tool 100 works normally, the MCU module 74 records the forward rotation state A of the motor 30. When the reversing switch 60 is set at a reverse direction, and the controlling switch 50 is turned on, the motor driving module 72 is powered on for driving the motor 30 to rotate. When the power tool 100 works normally, the MCU module 74 records the reversing rotation state B of the motor 30.

In another preferably embodiment of the present application, after the reversing switch 60 is operated, the power module 71 supplies power to the MCU module 74, and the MCU module 74 is initialized, and then the step (1) is executed; or the power module 71 supplies power to the MCU module 74, and after the MCU module 74 is initialized, the reversing switch 60 is operated, and then the step (1) is executed, wherein the step (1) includes: the controlling switch 50 is turned on, the motor driving module 72 is powered on for driving the motor 30 to rotate, the power tool 100 works normally. Thus, the MCU module 74 records the forward rotating state A or the reverse rotating state B of the motor 30.

In another preferably embodiment of the present application, the power tool further includes a memory module 73. The memory module 73 may start to work after the memory capacity of a FLASH memory in the MCU module 74 is full, and also may be used to save the anti-sparking method, which can be called from the memory module 73 by the MCU module 74 to execute. The anti-sparking method may include following steps.

(1) Turning on the controlling switch 50 to power on the motor driving module 72 for driving the motor 30 to rotate, which causes the power tool 100 to work normally. When the power tool 100 works normally, the memory module 73 records a first operation state of the motor 30, which may be a forward rotation state A or a reverse rotation state B.

(2) Turning off the controlling switch 50 to power down the motor driving module 72, which causes the motor 30 to begin to stop rotating. When the motor 30 begins to stop rotating, and the memory module 73 may record a time duration from a time point of the motor 30 being begun to stop rotating to a time point of the motor 30 completely stopped rotating, as t1.

(3) When the controlling switch 50 is turned on again, the memory module 73 may record a second operation state of the motor 30. The second operation state may be a forward rotation state A or a reverse rotation state B. When the second operation state is the same as the first operation state, the MCU module 74 may control the power module 71 to supply power to the motor driving module 72. When the second operation state is different from the first operation state, the MCU module 74 may control the power module 71 to supply power to the motor driving module 72 after a delay time duration, which is longer than t1.

As a whole, the anti-sparking method may include the following steps.

(1) The MCU module 74 may detect a signal generated by the controlling switch 50. When the MCU module 74 determines that the controlling switch 50 is turned on according to the signal, and the MCU module 74 records a first operation state of the motor 30, which may be a forward rotation state A or a reverse rotation state B.

(2) The MCU module 74 may detect the signal generated by the controlling switch 50. When the MCU module determines that the controlling switch 50 is turned off according to the signal, the motor 30 begins to stop rotating, and the MCU module 74 records a time duration from a time point of the motor 30 being begun to stop rotating to a time point of the motor 30 completely stopped rotating, as t1.

(3) The MCU module 74 may detect the signal of the controlling switch 50. When the MCU module 74 determines that the controlling switch 50 is turned on again according to the signal, and the MCU module 74 records a second operation state of the motor 30. When the second operation state is the same as the first operation state, the MCU module 74 may control the power module 71 to supply power to the motor driving module 72. When the second operation state is different from the first operation state, the MCU module 74 may control the power module 71 to supply power to the motor driving module 72 after a delay time duration, which is longer than t1.

The present application further provides a control device, the control device has an anti-sparking function, and control device includes:

A first processing module is configured to detect a signal generated by the controlling switch 50. When the first processing module determines that the controlling switch 50 is turned on according to the signal, and a first operation state of the motor 30 is recorded by the MCU module 74, which is a forward rotation state A or a reverse rotation state B.

A second processing module is configured to detect the signal generated by the controlling switch 50. When the second processing module determines that the controlling switch 50 is turned off according to the signal, and the motor 30 begins to stop rotating, and a time duration from a time point of the motor 30 being begun to stop rotating to a time point of the motor 30 completely stopped rotating is recorded as t1 by the MCU module 74.

A third processing module is configured to detect the signal generated by the controlling switch 50. When the third processing module determines that the controlling switch 50 is turned on again according to the signal, and a second operation state of the motor 30 is recorded by the MCU module 74. When the second operation state is the same as the first operation state, the third processing module may control the power module 71 to supply power to the motor driving module 72. When the second operation state is different from the first operation state, the third processing module may control the power module 71 to supply power to the motor driving module 72 after a delay time duration, which is longer than t1.

The first processing module, the second processing module, and the third processing module are same or different modules. For example, the first processing module, the second processing module, and the third processing module are the same modules, which are MCU module 74, such as in the present embodiment. For another example, all of the first processing module, the second processing module, and the third processing module are different modules, such as, the first processing module is a MCU module 74, the second processing module is a FPGA, and the third processing module is a module with other processing function, but not being limited.

The present application further provides a control device, which includes a memory and a processor. The memory stores computer programs operatable on the processor, and the processor executes the steps of the methods according to the method embodiments described above in executing the computer programs.

The present application further provides a computer readable storage medium, the computer readable storage medium having non-volatile program codes executable by a processor, where the program codes are used to make the processor execute the methods according to the method embodiments described above.

Compared with the prior art, the present application has the beneficial effects as follows: the present application provides an anti-sparking method for the power tool without occupying the internal space of the power tool and increasing a working efficiency; by using the anti-sparking method for the power tool, the space required to add magnetic rings and Hall elements at the motor end can be eliminated, thereby saving the internal space of the power tool Without the Hall component, there is no need to make the control panel connecting with the Hall component through the cable, thus a failure of the connecting is prevented, and a working efficiency of the tool is improved; by using the method of the present application, the magnetic ring and the Hall component may be omitted, and a cost is saved. It should be noted that a person skilled in the art can clearly understand that for convenient and concise descriptions, reference can be made to a corresponding process in the method embodiment regarding the specific working process of the system and apparatus described above. Thus, this is not repeatedly described herein.

When the function is implemented in the form of a software functional unit and sold or used as an independent product, it may be stored in a computer-readable storage medium. Based on this understanding, a technical scheme of the present application, in essence or a part that contributes to related technologies or a part of this technical scheme, may be reflected in the form of a software product, and this computer software product is stored in a storage medium, including a plurality of instructions used to enable a computer device (it may be a personal computer, a server, a network device or the like) to perform all or part of the steps of the method in each embodiment of the present application. The aforementioned storage medium includes: a USB flash disk, a mobile hard disk drive, a Read-Only Memory (ROM), a Random Access Memory (RAM), a magnetic disk or optical disk, and other media that may store program verification codes.

Finally, it should be noted that the above-mentioned embodiment are merely specific implementation modes of the present application and are used to explain the technical solution of the present application and shall not be construed as limitation. The scope of protection of the present application is not limited herein. Despite reference to the aforementioned embodiments to make a detailed description for the present application, it will be understood by those of ordinary skill in the art that those skilled in the art still can modify the technical solution recorded by the aforementioned embodiments or can come up with changes easily or make equivalent substitutions on part of technical features therein within the technical scope uncovered by the present application. Such modifications, changes or substitutions do not deviate the nature of the technical solution from the spirit and scope of the technical solution embodied in the embodiments according to the present application. They shall be covered within the scope of protection of the present application. Therefore, the scope of protection of the present application shall be subject to the scope of protection of the claims.

The invention claimed is:

1. An anti-sparking method for a power tool, the power tool comprises a power module, a motor, a controlling switch, a motor driving module, and a main control unit (MCU) module; the anti-sparking method comprises following steps:
   (1) turning on the controlling switch to control the power module supply power to the motor driving module for driving the motor to rotate, which causes the power tool to work normally; when the power tool is working normally, the MCU module records a first operation state of the motor, which is a forward rotation state A or a reverse rotation state B;
   (2) when the controlling switch is turned off, the power module cannot supply power to the motor driving module, which causes the motor to begin to stop rotating; when the motor begins to stop rotating, the MCU module records a time duration as t1 from a time point of the motor being begun to stop rotating to a time point of the motor completely stopped rotating;
   (3) when the controlling switch is turned on again, the MCU module records a second operation state of the motor; the second operation state is the forward rotation state A or the reverse rotation state B; when the second operation state is the same as the first operation state, the MCU module controls the power module to supply power to the motor driving module; when the second operation state is different from the first operation state, the MCU module controls the power module to supply power to the motor driving module after a delay time duration, which is longer than t1.

2. The anti-sparking method for the power tool according to claim 1, wherein the MCU module comprises a MCU chip; the MCU chip comprises a FLASH memory; the FLASH memory is configured to record at least one of the first operation state and the second operation state of the motor, and record the time duration t1 from a time point of the motor being begun to stop rotating to a time point of the motor completely stopped rotating.

3. The anti-sparking method for the power tool according to claim 2, wherein the power tool further comprise a memory module; the anti-sparking method comprises following steps:
   (1) turning on the controlling switch to control the power module supply power to the motor driving module for driving the motor to rotate, which causes the power tool to work normally; when the power tool is working normally, and the memory module records a first operation state of the motor, which is a forward rotation state A or a reverse rotation state B;
   (2) when the controlling switch is turned off the power module cannot supply power to the motor driving module which causes the motor to begin to stop rotating; when the motor begins to stop rotating, and the memory module records a time duration from a time point of the motor being begun to stop rotating to a time point of the motor completely stopped rotating, as t1;
   (3) when the controlling switch is turned on again, the memory module records a second operation state of the motor; the second operation state is a forward rotation state A or a reverse rotation state B; when the second operation state is the same as the first operation state, the MCU module controls the power module to supply power to the motor driving module; when the second operation state is different from the first operation state, the MCU module controls the power module to supply power to the motor driving module after a delay time duration, which is longer than t1.

4. The anti-sparking method for the power tool according to claim 1, wherein the motor driving module comprises a first bidirectional diode, a second bidirectional diode, a third bidirectional diode, and a fourth bidirectional diode; when the motor rotates in a forward direction, the first bidirectional diode and the second bidirectional diode are in a turn-on state, and the third bidirectional diode and the fourth bidirectional diode are in a turn-off state; when the motor rotates in a reverse direction, the third bidirectional diode and the fourth bidirectional diode are in the turn-on state, and the first bidirectional diode and the second bidirectional diode are in the turn-off state.

5. The anti-sparking method for the power tool according to claim 1, wherein the power tool comprises a reversing switch for controlling the forward rotation state and the reverse rotation state of the motor; in the step (1), when the reversing switch is set at a forward direction and the controlling switch is turned on, the power module supplies power to the motor driving module for driving the motor to rotate; when the power tool is working normally, and the MCU module records the forward rotation state A of the motor; when the reversing switch is set at a reverse direction, and the controlling switch is turned on, the power module supplies power to the motor driving module for driving the motor to rotate; when the power tool is working normally, the MCU module records the reversing rotation state B of the motor.

6. The anti-sparking method for the power tool according to claim 1, wherein the MCU module is electrically connected with the motor driving module and the power module; the power module is electrically connected with the motor driving module.

7. The anti-sparking method for the power tool according to claim 1, wherein the power tool further comprises a housing, an execution component, and a transmission mechanism for driving the execution component while being driven by the motor; the motor is disposed in the housing.

8. A control device for controlling a power tool; the power tool comprises a power module, a motor, a controlling switch, a motor driving module, and a MCU module, wherein the control device with an anti-sparking function, the control device comprises:
   a first processing module configured to detect a signal generated by the controlling switch; when the first processing module determines that the controlling switch is turned on according to the signal, and MCU module records a first operation state of the motor, which is a forward rotation state A or a reverse rotation state B;
   a second processing module configured to detect the signal generated by the controlling switch; when the second processing module determines that the controlling switch is turned off according to the signal, the motor begins to stop rotating, and the MCU module records a time duration from a time point of the motor being begun to stop rotating to a time point of the motor completely stopped rotating, as t1;

a third processing module configured to detect the signal generated by the controlling switch; when the third processing module determines that the controlling switch is turned on again according to the signal, the MCU module records a second operation state of the motor; when the second operation state is the same as the first operation state, the third processing module controls the power module to supply power to the motor driving module; when the second operation state is different from the first operation state, the third processing module controls the power module to supply power to the motor driving module after a delay time duration, which is longer than t1.

9. The control device according to claim 8, wherein the first processing module, the second processing module, and the third processing module are same or different modules.

10. The control device according to claim 8, wherein the MCU module comprises a MCU chip;

the MCU chip comprises a FLASH memory; the FLASH memory is configured to record at least one of the first operation state and the second operation state of the motor, and record the time duration t1 from a time point of the motor being begun to stop rotating to a time point of the motor completely stopped rotating.

11. The control device according to claim 10, wherein the power tool further comprises a memory module; the memory module is configured to record the first operation state of the motor, the time duration from the time point of the motor being begun to stop rotating to the time point of the motor completely stopped rotating, as t1, and the second operation state of the motor.

12. The control device according to claim 8, wherein the motor driving module comprises a first bidirectional diode, a second bidirectional diode, a third bidirectional diode, and a fourth bidirectional diode; when the motor rotates in a forward direction, the first bidirectional diode and the second bidirectional diode are in a turn-on state, and the third bidirectional diode and the fourth bidirectional diode are in a turn-off state; when the motor rotates in a reverse direction, the third bidirectional diode and the fourth bidirectional diode are in the turn-on state, and the first bidirectional diode and the second bidirectional diode are in the turn-off state.

13. The control device according to claim 8, wherein the power tool comprises a reversing switch for controlling the forward rotation state and the reverse rotation state of the motor; when the reversing switch is set at a forward direction and the controlling switch is turned on, the power module supplies power to the motor driving module for driving the motor to rotate; when the power tool is working normally, and the MCU module records the forward rotation state A of the motor; when the reversing switch is set at a reverse direction, and the controlling switch is turned on, the power module supplies power to the motor driving module for driving the motor to rotate; when the power tool is working normally, the MCU module records the reversing rotation state B of the motor.

14. The control device according to claim 8, wherein the MCU module is electrically connected with the motor driving module and the power module; the power module is electrically connected with the motor driving module.

15. A computer readable storage medium used in a power tool, the power tool comprises a power module, a motor, a controlling switch, a motor driving module, and a MCU module; the computer readable storage medium having non-volatile program codes executable by a processor, wherein the program codes are used to make the processor execute the following steps:

(1) turning on the controlling switch to control the power module supply power to the motor driving module for driving the motor to rotate, which causes the power tool to work normally; when the power tool is working normally, the MCU module records a first operation state of the motor, which is a forward rotation state A or a reverse rotation state B;

(2) when the controlling switch is turned off, the power module cannot supply power to the motor driving module, which causes the motor to begin to stop rotating; when the motor begins to stop rotating, the MCU module records a time duration as t1 from a time point of the motor being begun to stop rotating to a time point of the motor completely stopped rotating;

(3) when the controlling switch is turned on again, the MCU module records a second operation state of the motor; the second operation state is the forward rotation state A or the reverse rotation state B; when the second operation state is the same as the first operation state, the MCU module controls the power module to supply power to the motor driving module; when the second operation state is different from the first operation state, the MCU module controls the power module to supply power to the motor driving module after a delay time duration, which is longer than t1.

16. The computer readable storage medium according to claim 15, wherein the MCU module comprises a MCU chip; the MCU chip comprises a FLASH memory; the FLASH memory is configured to record at least one of the first operation state and the second operation state of the motor, and record the time duration t1 from a time point of the motor being begun to stop rotating to a time point of the motor completely stopped rotating.

17. The computer readable storage medium according to claim 16, wherein the processor further:

(1) turning on the controlling switch to control the power module supply power to the motor driving module for driving the motor to rotate, which causes the power tool to work normally; when the power tool is working normally, and the memory module records a first operation state of the motor, which is a forward rotation state A or a reverse rotation state B;

(2) when the controlling switch is turned off the power module cannot supply power to the motor driving module which causes the motor to begin to stop rotating; when the motor begins to stop rotating, and the memory module records a time duration from a time point of the motor being begun to stop rotating to a time point of the motor completely stopped rotating, as t1;

(3) when the controlling switch is turned on again, the memory module records a second operation state of the motor; the second operation state is a forward rotation state A or a reverse rotation state B; when the second operation state is the same as the first operation state, the MCU module controls the power module to supply power to the motor driving module; when the second operation state is different from the first operation state, the MCU module controls the power module to supply power to the motor driving module after a delay time duration, which is longer than t1.

18. The computer readable storage medium according to claim 15, wherein the motor driving module comprises a first bidirectional diode, a second bidirectional diode, a third bidirectional diode, and a fourth bidirectional diode; when the motor rotates in a forward direction, the first bidirectional diode and the second bidirectional diode are in a turn-on state, and the third bidirectional diode and the fourth bidirectional diode are in a turn-off state; when the motor rotates in a reverse direction, the third bidirectional diode and the fourth bidirectional diode are in the turn-on state, and the first bidirectional diode and the second bidirectional diode are in the turn-off state.

19. The computer readable storage medium according to claim 15, wherein the power tool comprises a reversing switch for controlling the forward rotation state and the reverse rotation state of the motor; when the reversing switch is set at a forward direction and the controlling switch is turned on, the power module supplies power to the motor driving module for driving the motor to rotate; when the power tool is working normally, and the MCU module records the forward rotation state A of the motor; when the reversing switch is set at a reverse direction, and the controlling switch is turned on, the power module supplies power to the motor driving module for driving the motor to rotate; when the power tool is working normally, the MCU module records the reversing rotation state B of the motor.

20. The computer readable storage medium according to claim 15, wherein the MCU module is electrically connected with the motor driving module and the power module; the power module is electrically connected with the motor driving module.

\* \* \* \* \*